United States Patent [19]
Perrero

[11] Patent Number: 5,131,849
[45] Date of Patent: Jul. 21, 1992

[54] TEACHING BOARD APPARATUS

[76] Inventor: John J. Perrero, 229 Rockland Street, Calumet, Mich. 49913

[21] Appl. No.: 770,882

[22] Filed: Oct. 4, 1991

[51] Int. Cl.$^5$ ............................................. G09B 23/26
[52] U.S. Cl. .................... 434/281; 434/408; 434/417; 434/418; 434/430; 434/429
[58] Field of Search ............. 434/281, 298, 300, 301, 434/278, 408, 417, 418, 430, 429

[56] References Cited

U.S. PATENT DOCUMENTS

| | | | |
|---|---|---|---|
| 552,914 | 1/1896 | Laughlin | 434/418 |
| 3,173,217 | 3/1965 | Schultz | 434/430 X |
| 3,406,972 | 10/1968 | Wong | 434/281 X |
| 3,659,355 | 5/1972 | Aubin, Jr. | 434/408 |
| 4,192,084 | 3/1980 | O'Riordan | 434/298 X |
| 5,035,626 | 7/1991 | Persing | 434/429 X |

*Primary Examiner*—John J. Wilson
*Assistant Examiner*—Jeffrey A. Smith
*Attorney, Agent, or Firm*—Leon Gilden

[57] ABSTRACT

A board apparatus is arranged for educational presentation of inter-relationship relative to atomic particles and their associated energy levels relative to interaction of such particles, wherein the board structure includes a central ferrous metallic base plate formed with a perimeter framework accommodating a plurality of ferrous metallic discs to simulate atomic particles such as electrons and their interaction relative to one another. A modification of the invention includes a dispenser housing mounted to a first side of the framework and a container housing mounted to a second side of the framework to provide for the respective dispensing of the discs and the storage of writing instruments. An alignment board is reciprocatably mounted relative to a forward surface of the base plate for the positioning and alignment illustration in the use of the particles, wherein the board is arranged in a spaced relationship relative to the base plate to permit the discs to be received between the base plate and the alignment board.

1 Claim, 4 Drawing Sheets

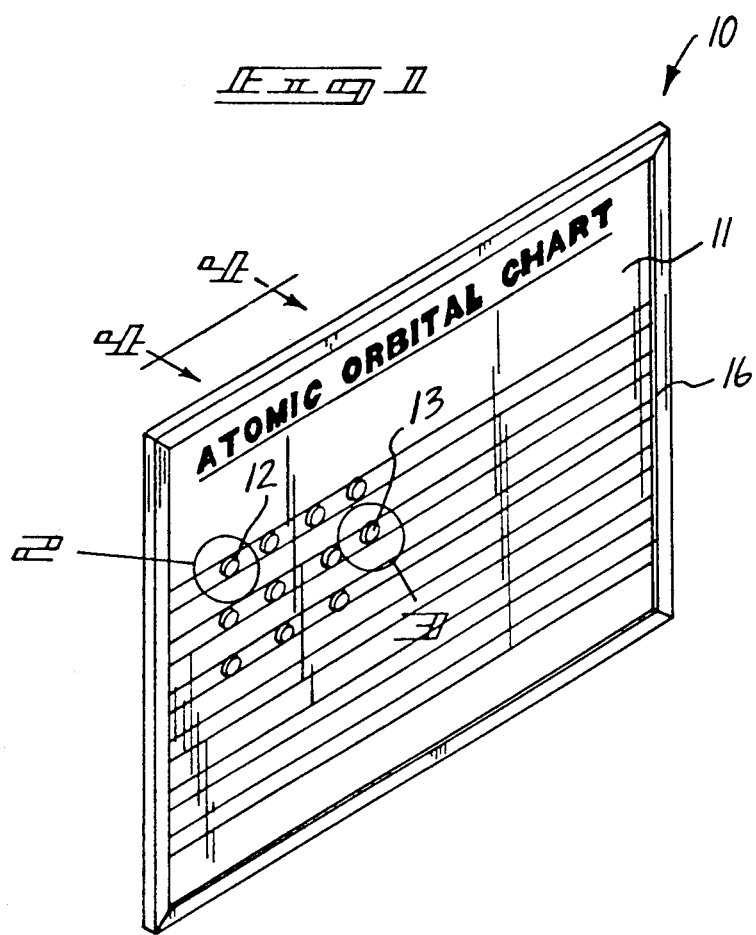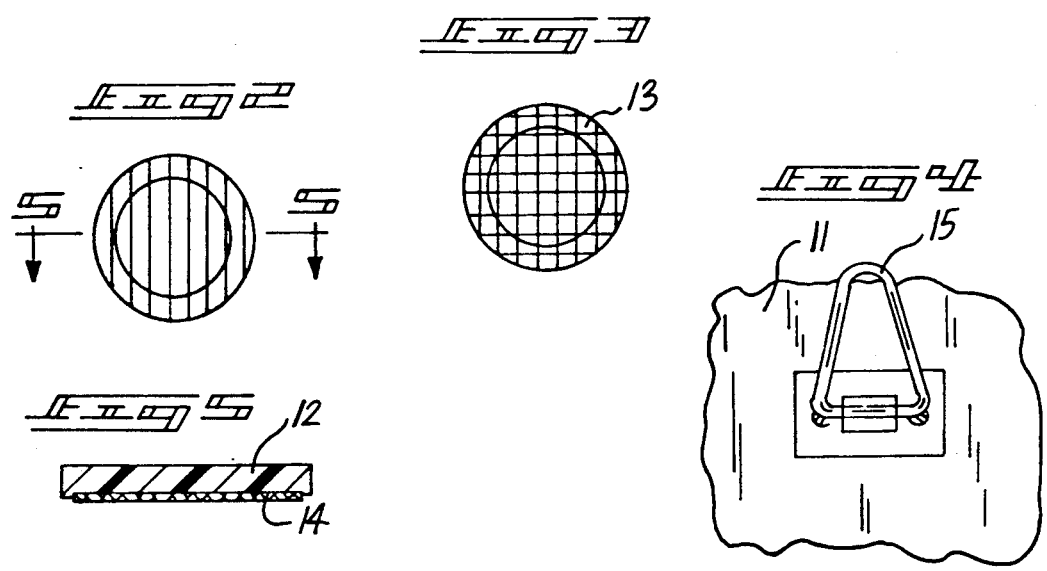

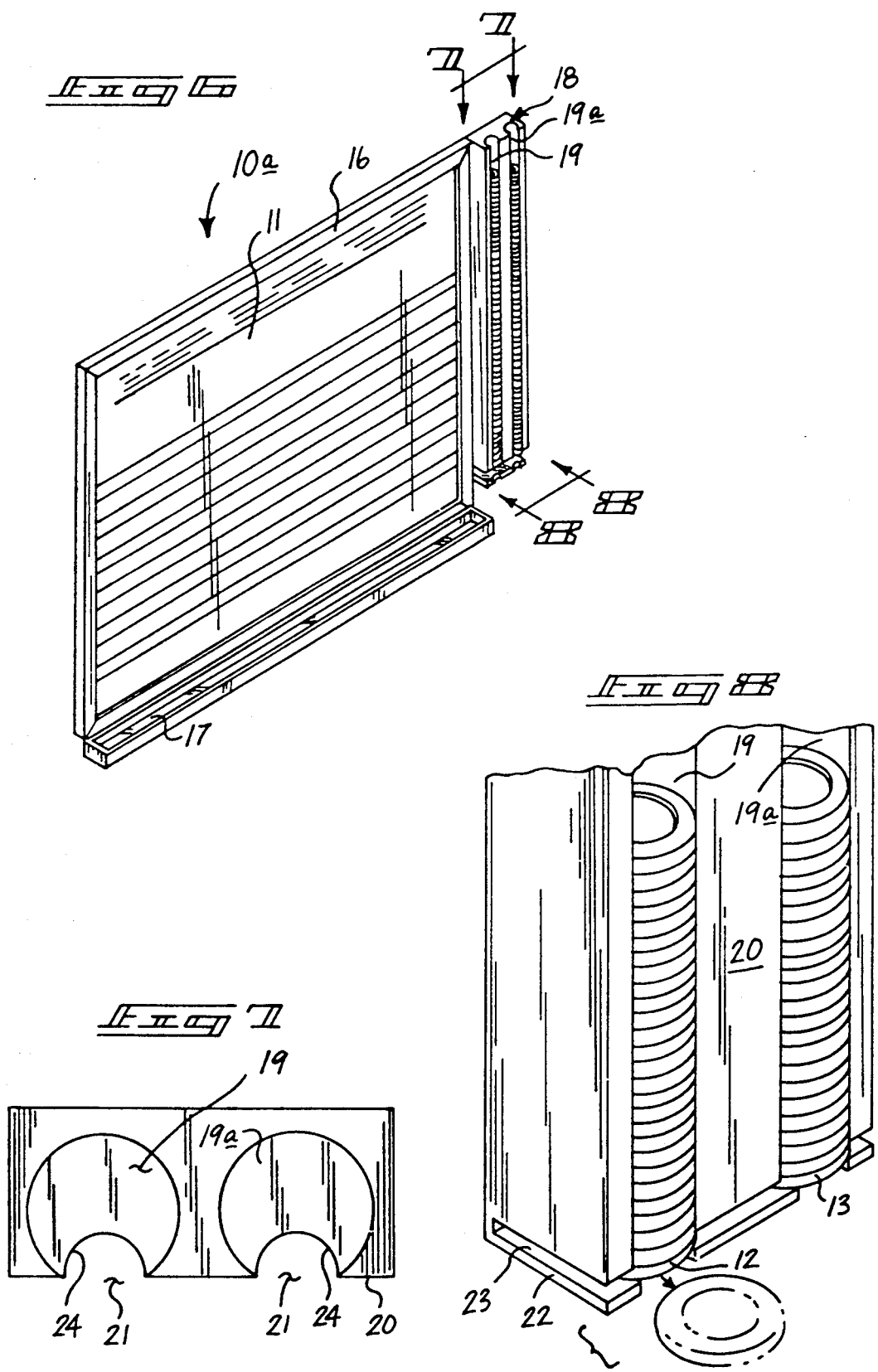

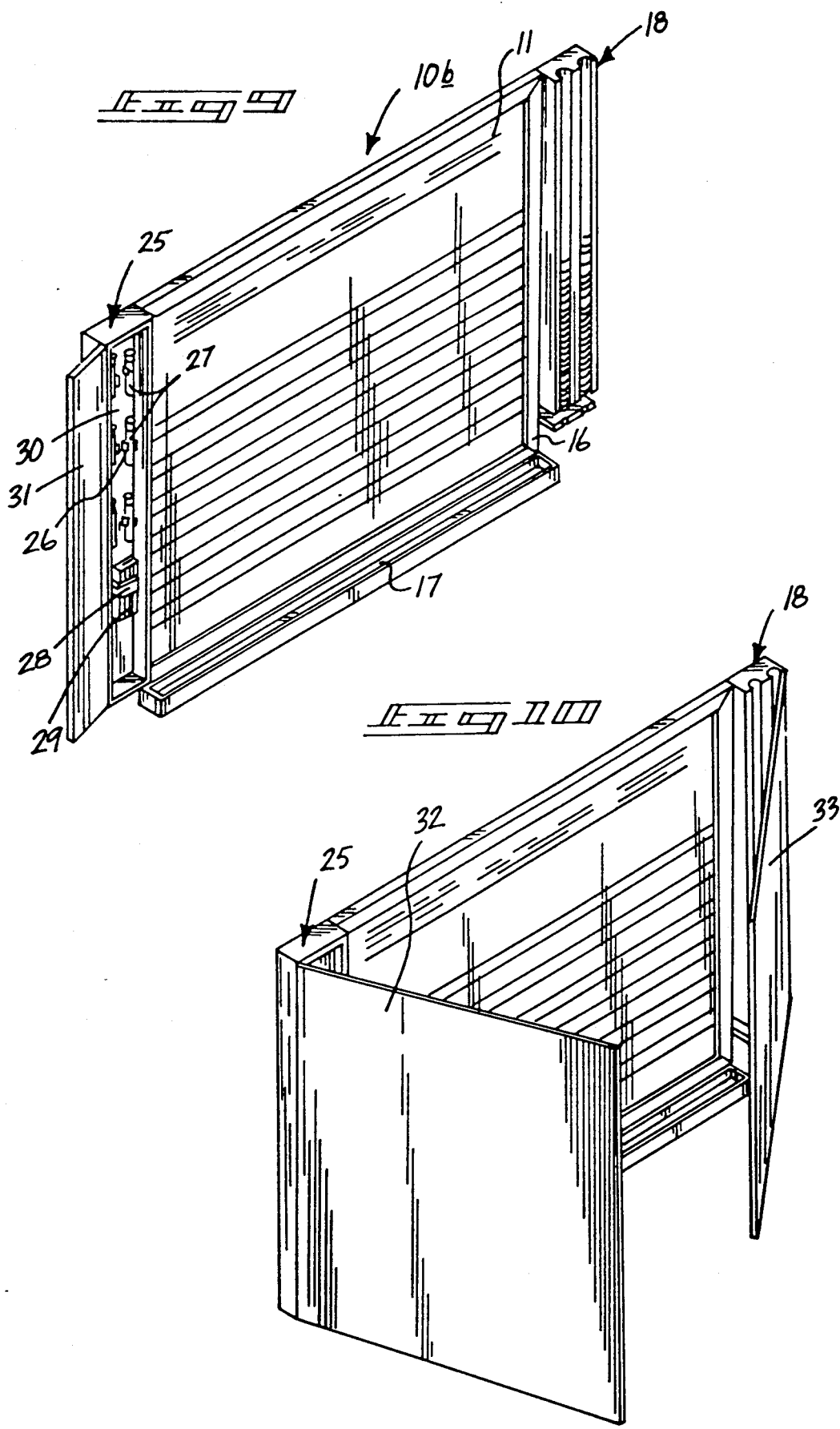

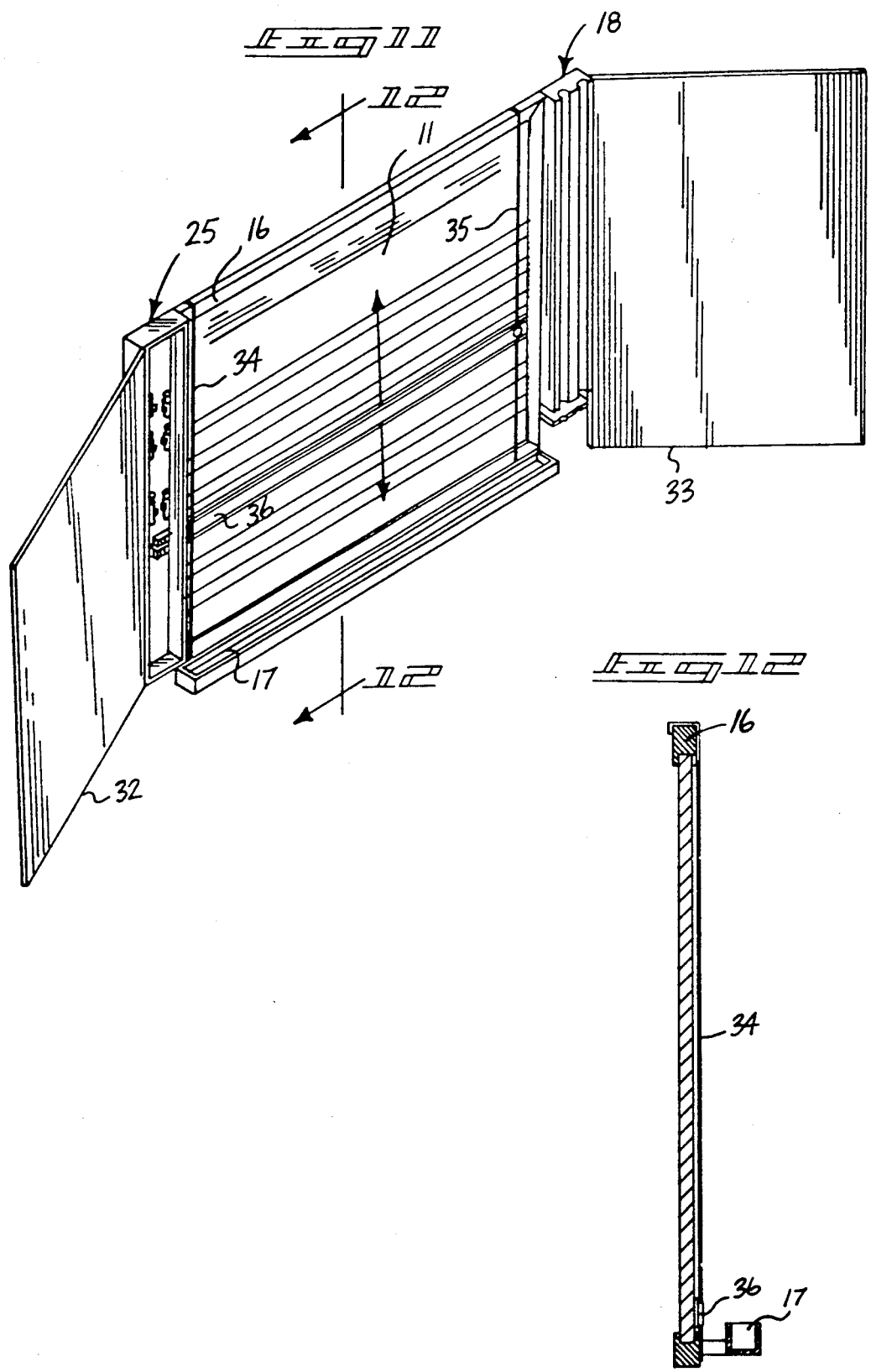

TEACHING BOARD APPARATUS

BACKGROUND OF THE INVENTION

1. Field of the Invention

The field of invention relates to teaching apparatus, and more particularly pertains to a new and improved teaching board apparatus wherein the same is arranged for the visual illustration of various atomic components and their inter-relationship.

2. Description of the Prior Art

Teaching needs of various types are utilized in the prior art to illustrate the relationship of atomic particles such as electrons, protons, and the like and their inter-relationship. Energy levels of the particles and their association are best understood when arranged in a visual representation relative to one another.

Prior art structure as set forth in U.S. Pat. No. 3,866,337 to Burns sets forth an atomic model arrangement for demonstrating atomic structure utilizing various planetary drive discs to position and orient the various particles relative to one another in a representative manner.

U.S. Pat. No. 4,810,197 to Hicks is arranged for the magnetic mounting of spheres to a board in a peripheral similar order as in a periodic chart. Various size, color, and density in electronic affinity are represented thereby.

U.S. Pat. No. 4,074,443 to Wilkerson sets forth an atom demonstrator wherein a globe includes spaced light bulbs on its surface for various illustration of paths of particles associated relative to an atomic structure.

As such, it may be appreciated that there continues to be a need for a new and improved teaching board apparatus as set forth by the instant invention which addresses both the problems of ease of use as well as effectiveness in construction in providing for a conventional representation of electron inter-relationships, as well as other particle inter-relationships relative to one another.

SUMMARY OF THE INVENTION

In view of the foregoing disadvantages inherent in the known types of teaching apparatus now present in the prior art, the present invention provides a teaching board apparatus wherein the same provides for a unitary organization to house for demonstrative purposes various components and inter-relationships of atomic particles. As such, the general purpose of the present invention, which will be described subsequently in greater detail, is to provide a new and improved teaching board apparatus which has all the advantages of the prior art teaching apparatus and non of the disadvantages.

To attain this, the present invention provides a board apparatus arranged for educational presentation of inter-relationship relative to atomic particles and their associated energy levels relative to interaction of such particles, wherein the board structure includes a central ferrous metallic base plate formed with a perimeter framework accommodating a plurality of ferrous metallic discs to simulate atomic particles such as electrons and their interaction relative to one another. A modification of the invention includes a dispenser housing mounted to a first side of the framework and a container housing mounted to a second side of the framework to provide for the respective dispensing of the discs and the storage of writing instruments. An alignment board is reciprocatably mounted relative to a forward surface of the base plate for the positioning and alignment illustration in the use of the particles, wherein the board is arranged in a spaced relationship relative to the base plate to permit the discs to be received between the base plate and the alignment board.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved teaching board apparatus which has all the advantages of the prior art teaching apparatus and none of the disadvantages.

It is another object of the present invention to provide a new and improved teaching board apparatus which may be easily and efficiently manufactured and marketed.

It is a further object of the present invention to provide a new and improved teaching board apparatus which is of a durable and reliable construction.

An even further object of the present invention is to provide a new and improved teaching board apparatus which is susceptible of a low cost of manufacture with regard to both materials and labor, and which accordingly is then susceptible of low prices of sale to the consuming public, thereby making such teaching board apparatus economically available to the buying public.

Still yet another object of the present invention is to provide a new and improved teaching board apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an orthographic top view of a first magnetic disc as set forth in Section of FIG. 1.

FIG. 3 is an orthographic top view of a second disc set forth in Section 3 of FIG. 1.

FIG. 4 is an orthographic view, taken along the lines 4—4 of FIG. 1 in the direction indicated by the arrows.

FIG. 5 is an orthographic view, taken along the lines 5—5 of FIG. 2 in the direction indicated by the arrows.

FIG. 6 is an isometric illustration of a modified board structure utilized by the invention.

FIG. 7 is an orthographic view, taken along the lines 7—7 of FIG. 6 in the direction indicated by the arrows.

FIG. 8 is an isometric illustration, taken along the lines 8—8 of FIG. 6 in the direction indicated by the arrows.

FIG. 9 is an isometric illustration of a further modified apparatus utilized by the invention.

FIG. 10 is an isometric illustration of the invention utilizing cover plates for protecting a forward surface of the board structure.

FIG. 11 is an isometric illustration of the invention utilizing an alignment board vertically mounted relative to the base plate of the invention.

FIG. 12 is an orthographic view, taken along the lines 12—12 of FIG. 11 in the direction indicated by the arrows.

DESCRIPTION OF THE PREFERRED EMBODIMENT

With reference now to the drawings, and in particular to FIGS. 1 to 12 thereof, a new and improved teaching board apparatus embodying the principles and concepts of the present invention and generally designated by the reference numerals 10, 10a, and 10b will be described.

More specifically, the teaching board apparatus 10 of the instant invention essentially comprises a ferrous metallic planar base plate 11 arranged for the magnetic adherence of magnetic discs defined by at least the first and second magnetic discs 12 and 13 respectively. The first and second magnetic discs 12 and 13 are of a first and second respective coloration for illustration of relative clockwise and counter-clockwise orientation of electrons for their subsequent interchange relative to a respective atomic nucleus. The discs 12 and 13 are each formed with a ferromagnetic base 14 (see FIG. 5) for their selective adherence about the base plate 11. A rear wall of the base plate 11 includes at least one, if not a plurality, of support loops 15 for permitting mounting of the apparatus onto a vertical wall support surface.

The apparatus 10a, as illustrated in FIG. 6, includes a support trough 17 to capture discs and arranged for their temporary storage thereof, as well as writing instruments. The trough 17 is essentially coextensive with a bottom edge of the perimeter framework 16 arranged in surrounding relationship relative to the base plate 11. The FIG. 6 illustrates the use of the dispensing housing 18 fixedly mounted relative to the perimeter frame and a right side thereof to include a plurality of semi-cylindrical cavities defined by a respective first and second cavity 19 and 19a that are arranged parallel relative to one another mounted within the dispensing housing 18. The dispensing housing 18 includes a housing front wall 20 formed with access openings 21 and 21a directed coextensively of each of the cavities 19 and 19a respectively through the front wall 20. The access openings 21 permit manual access into the cavities for the alignment of the various discs positioned therewithin. A housing floor 22 is arranged to define a housing slot 23 between the cavities 19 and 19a and the floor 22, wherein the slot 23 extends orthogonally relative to the front wall 20 and is of a height substantially equal to a thickness of one of the discs 12 and 13 to permit their removal from a lowermost portion of a stack positioned within each of the cavities 19.

A first and second slot 24 is positioned below the respective first and second cavity directed into the floor 22 as illustrated in FIG. 7.

The structure 10b, as illustrated in the FIGS. 9 and 10 for example, further includes a container housing 25 mounted coextensively to a left side edge of the perimeter framework 16 and includes a container housing rear wall 30 mounting a plurality of support clip pairs 26, wherein each pair of the support clip pairs 26 includes a writing marker 27 contained therewithin. An elastomeric support band 28 mounted below the support clip pairs 26 mounts a plurality of chalk rods 29. A cover door 31 is hingedly mounted to provide overlying coverage of the inner housing 25, or alternatively as illustrated in FIG. 10, first and second cover plates 32 and 33 may be provided hingedly mounted to respective outer right and outer left edges of the dispensing housing 18 and the container housing 25 respectively. A predetermined length is defined between the right outer edge of the dispensing housing 18 and the left outer edge of the container housing 25, wherein each cover plate 32 and 33 is defined by a cover plate length substantially equal to one-half the predetermined length to provide coverage protection for the board structure.

Further, the use of an alignment board 36 is provided to provide for alignment of various of the discs when mounted to the base plate 11, wherein the alignment board 36 includes a respective first and second flexible guide wire 34 and 35 orthogonally directed through and in a frictional sliding relationship adjacent the respective right and left edges of the alignment board 36 to permit vertical sliding of the board in the use as a teaching aid in the alignment and an emphasis of various portions of the base plate 11.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A teaching board apparatus, comprising, a ferrous metallic base plate, the base plate including a perimeter framework extending coextensively about the base plate, wherein the perimeter framework includes a right side edge and a left side edge, and a plurality of magnetic discs to include first magnetic discs and second magnetic discs, wherein the first magnetic discs are of a first coloration and the second magnetic discs are of a second coloration to effect contrasting visual illustration representative of atomic particles, and each of the magnetic discs includes a ferromagnetic base magnetically adherable to a forward surface of the base plate, and a support trough fixedly mounted to the perimeter framework orthogonally between the right side edge and the left side edge, wherein the support trough is mounted adjacent a lower terminal end of the first side edge and the left side edge, wherein the support trough is arranged for receiving said magnetic discs and writing instruments therewithin, and a dispensing housing fixedly mounted to the perimeter framework adjacent the right side edge, wherein the dispensing housing is longitudinally aligned and vertically oriented relative to the base plate and includes a respective first and second semi-cylindrical cavity, and the dispensing housing includes a housing front wall, the housing front wall includes a respective first and second access opening coextensively directed through the front wall coextensive with the respective first and second cavity, and the dispensing housing including a housing floor, the housing floor defining a housing slot orthogonally directed through the housing front wall between the housing floor and the first and second semi-cylindrical cavities, wherein the first and second semi-cylindrical cavities includes a respective first and second column of said first and second magnetic discs, and the housing floor includes a first and second slot positioned below the respective first and second cavity directed into the housing floor from a forward edge of the housing floor, wherein the forward edge of the housing floor is coplanar with the housing front wall, and a container housing mounted to the left side edge of the perimeter framework, the container housing including a container housing rear wall, and a plurality of pairs of spring clip members mounted to the housing rear wall, and each of the spring clip members includes a writing instrument removably mounted within each of said pair of spring clip members, and an elastomeric band mounted to the housing rear wall, wherein the elastomeric band includes a matrix of chalk rods contained therewithin, and the container housing includes a container housing left edge and the dispensing housing includes a dispensing housing right edge, and a predetermined length is defined between the container housing left edge and the dispensing housing right edge, and a first cover plate is pivotally mounted to the container housing left edge, and a second cover plate is pivotally mounted to the dispensing housing right edge, wherein the first and second cover plates are each defined by a length equal to one-half the predetermined length, and a respective first and second flexible guide wire arranged parallel to the respective left and side edges of the perimeter framework adjacent the respective left and side edges of the perimeter framework, and the first and second flexible guide wires frictionally, orthogonally, and slidably directed through an alignment board arranged orthogonally between the respective first and second side edges, wherein the alignment board is vertically displaceable along the respective first and second flexible guide wires for visual enhancement of a horizontal component of the planar base plate.

* * * * *